United States Patent [19]

Foufounis

[11] 4,344,162
[45] Aug. 10, 1982

[54] AUTOMATIC RECORD CHANGING APPARATUS

[76] Inventor: Jean Foufounis, Denens s Morges, Vaud, Switzerland, CH-1141

[21] Appl. No.: 196,047

[22] PCT Filed: Aug. 29, 1979

[86] PCT No.: PCT/CH79/00114
§ 371 Date: Apr. 30, 1980
§ 102(e) Date: Apr. 22, 1980

[87] PCT Pub. No.: WO80/00508
PCT Pub. Date: Mar. 20, 1980

[30] Foreign Application Priority Data

Aug. 30, 1978 [CH] Switzerland .................. 9156/78

[51] Int. Cl.$^3$ ............................................. G11B 17/24
[52] U.S. Cl. ................................................ 369/37
[58] Field of Search ................. 369/37, 36, 38, 178, 369/179

[56] References Cited

U.S. PATENT DOCUMENTS

| | | | |
|---|---|---|---|
| 2,937,026 | 5/1960 | Acker | 369/37 |
| 2,959,417 | 11/1960 | Vanderzee et al. | 369/37 |
| 3,008,721 | 11/1961 | Corbett et al. | 369/37 |
| 3,380,742 | 4/1968 | Horstmann | 369/37 |

Primary Examiner—Harry N. Haroian
Attorney, Agent, or Firm—Emory L. Groff, Jr.

[57] ABSTRACT

The automatic record changing apparatus comprises a rotating magazine (3) turning on a tube (2) which is inclined at about 45° in relation to the horizontal. The tube (2) carries a case (4) containing a control mechanism for extracting a record (5) from the magazine (3) by means of a lever (18) and brings it to its playing position (5'). This mechanism also controls the placing and retraction of a pick-up arm (20). Due to the inclined arrangement of the magazine (3), the space occupied in depth (A) and height (B) is less than in well-known apparatus.

6 Claims, 6 Drawing Figures

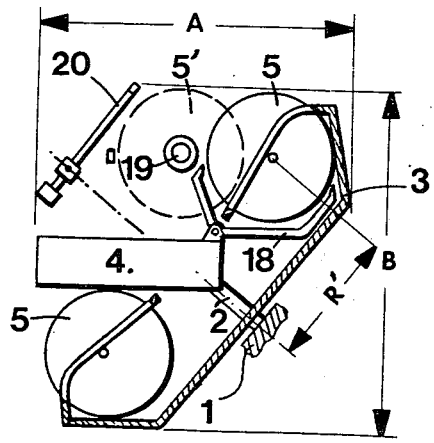
FIG. 1
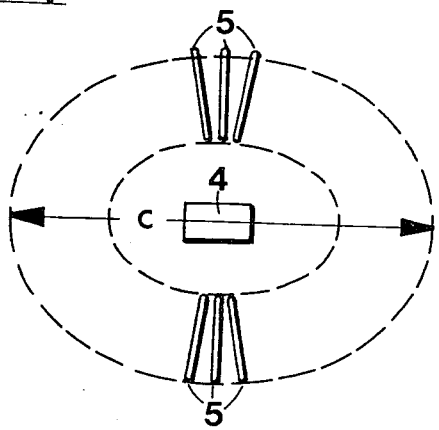
FIG. 2
FIG. 6
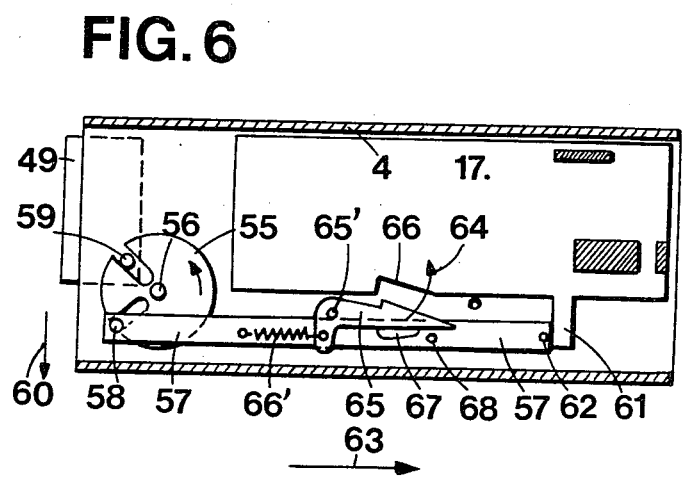

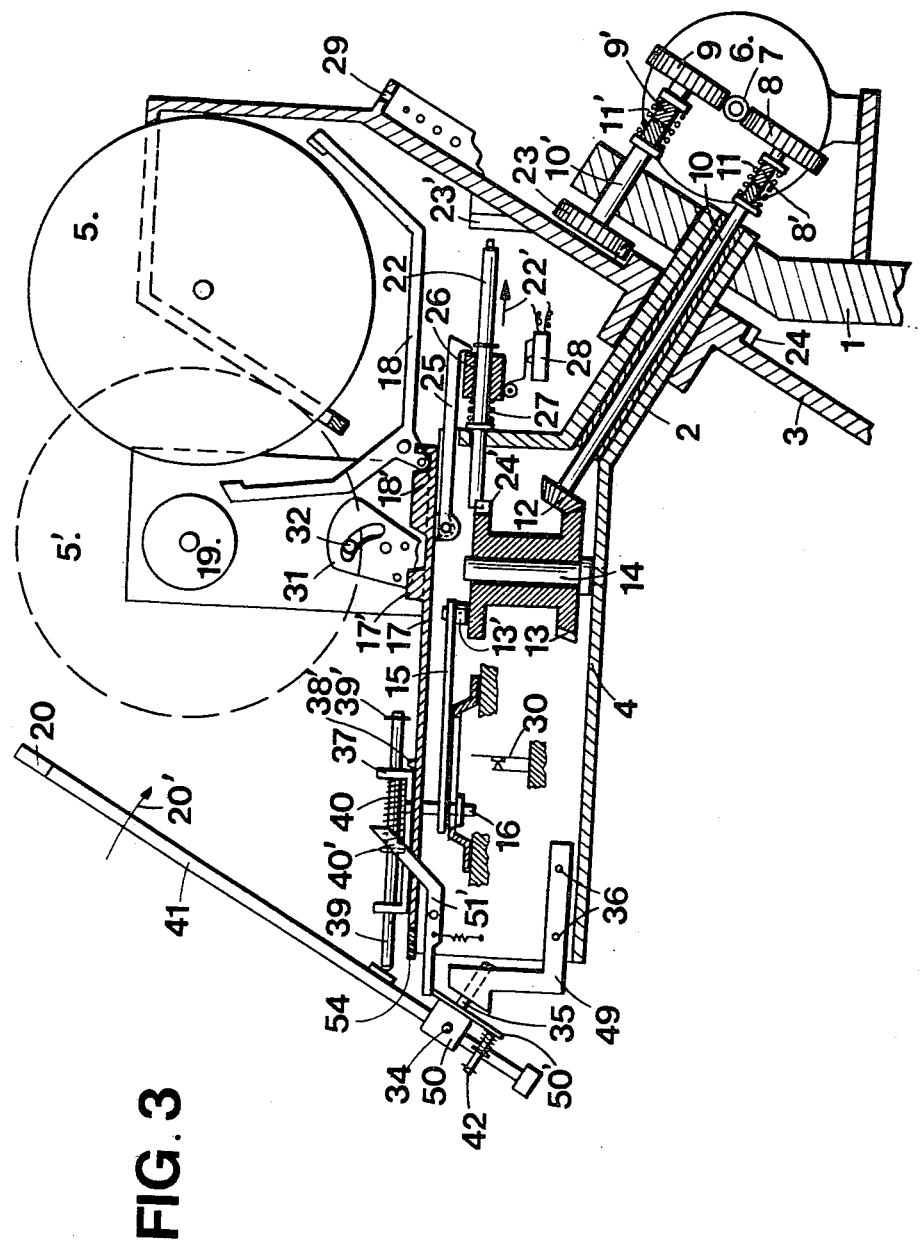

AUTOMATIC RECORD CHANGING APPARATUS

SUMMARY OF THE INVENTION

It is well known to provide an automatic record changing apparatus which comprises means for playing a record, including a rotating magazine presenting slots designed to receive records, said slots being shaped so that the plane of each record is appreciably parallel to the rotation axis of the magazine, the assembly of the records occupying a space of general toric form, means for controlling the angular displacements of the magazine to voluntarily bring each of the records to a selection position, a control mechanism allowing extracting of the record occupying the selection position in order to bring it to a playing position by said playing means and then to replace it in its slot.

In such well known apparatus, the rotating magazine is driven by a particular device in order to bring it to the position where the chosen record moves into a selection position. The control mechanism is formed by another independent device which must cooperate with the record in the selection position in order to bring it to playing position.

Such well known apparatus are heavy and cumbersome and comprise a large number of mechanical parts. This results in the necessity of effecting numerous delicate adjustments which render the apparatus expensive and expose it to numerous risks of faulty operation.

The present invention has for its object to remedy these disadvantages and provide an automatic record changing apparatus which is simple, light and less cumbersome while offering a large loading capacity capable of containing a large number of records. In addition, the apparatus is sturdy and requires practically no adjustment.

The automatic record changing apparatus according to the invention is characterized in that it comprises a base carrying a motor providing the drive means for the rotating magazine, a pivot around which the magazine turns, the free end of said pivot carrying the control mechanism.

If, in addition to the preceding arrangement, rotation the axis of the magazine is inclined so that it makes a 45° angle with a horizontal plane, there is obtained a minimum of space occupied by the device as far as depth is concerned.

The attached drawings illustrate, schematically and by way of example, a preferred form of execution of the record changing which is the object of the present invention in which:

BRIEF DESCRIPTION OF THE DRAWING

FIG. 1 is a lateral schematic view showing the general arrangement of the apparatus.

FIG. 2 shows the front of the space occupied by the records carried by the magazine.

FIG. 3 is a partial section along the axis of rotation of the magazine and showing the record changing mechanism.

FIGS. 5 and 6 are plan views of a part of the pick-up arm control mechanism.

DETAILED DESCRIPTION

Figure 4:
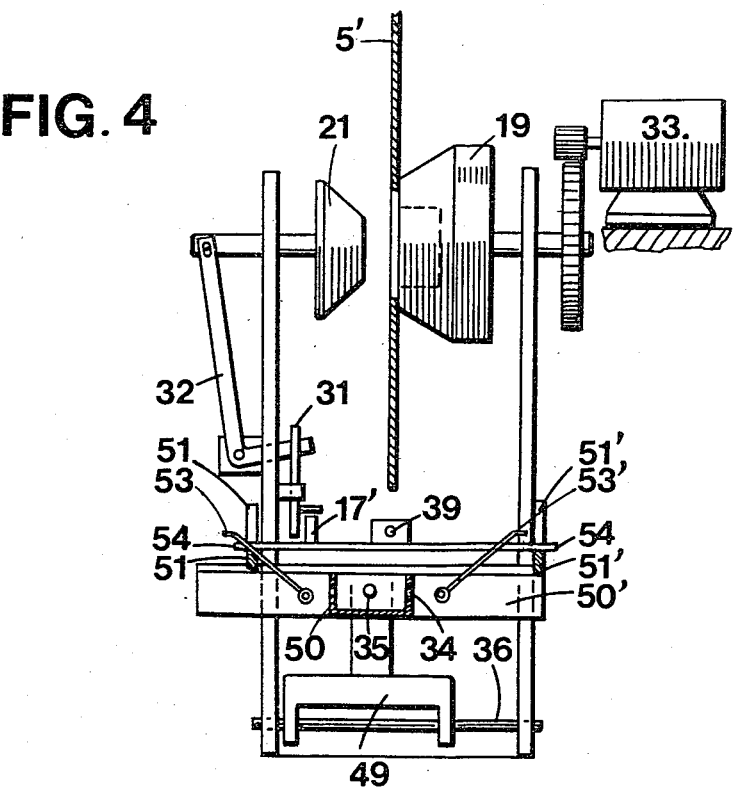
FIG. 4 shows the front of the mechanism for rotatably driving the record for the playing thereof.

In reference to FIGS. 1 and 2, the apparatus comprises a rotating magazine 3 mounted on a tubular pivot 2 connected with a base 1 and inclined at 45° in comparison with a horizontal plane. The magazine 3 includes spaces each forming a slot for a record 5. The assembly of the records carried by the magazine 3 occupies a space of general toric form whose exterior diameter is designated by C in reference to FIG. 2.

The pivot 2 further carries a case 4 shielding a mechanism allowing the extraction of a record 5 from its slot in order to bring it to its playing position 5'. In this playing position, the record is driven by a boss 19 and the playing is effected by a play-back head carried by a pick-up arm 20.

As shown in FIG. 1, the 45° inclination of the rotation of the magazine allows obtaining a minimum of space occupied by the apparatus, its depth A and its length B, both being smaller than the exterior diameter C of the toric space occupied by the records 5.

FIG. 3 shows the principal part of the record changing mechanism. The pivot 2 on which the magazine turns is comprised of a tube whose end is connected with the supporting base 1, while its other end carries the case 4. The base 1 has an electric motor 6 mounted thereon whose shaft is provided with a worm screw 7 engaged with two toothed wheels 8 and 9 and thus causes the two wheels to turn in the opposite direction from each other.

The shafts 8' and 9' of the wheels 8 and 9 drive shafts 10 and 10' through means of a free wheel arrangement, formed in a well known manner by springs 11 and 11'. The motor 6 is reversible, so that depending upon its direction of rotation, it drives shaft 10 or shaft 10'. The shaft 10 carries a toothed wheel 23 engaged with a toothed portion 24 of the magazine 3. The magazine also has openings 29 allowing it to read its position by well known means and allowing control of the halting of the magazine in order to stop a record 5 selected by the user in its selection position which is opposite the lever 18.

When the direction of rotation of the motor 6 is reversed, it drives, by means of a spring 11 acting as a friction coupling, shaft 10 and conical pinion 12 carried by said shaft. This pinion 12 is engaged with a toothed portion on a turntable 13 freely rotatable on an axle 14.

This turntable is capable of being locked in an angular position by the shank of a bolt 22. The bolt is pushed into a notch 24' on part 13 by a spring 27. The latter acts as a fulcrum, on the one hand with a ring-shaped molding on the shank of the bolt 22 and, on the other hand, with a cylindrical coupler 26 which is held in position by a catch 25. The cylindrical coupler 26 operates equally on a device 28 for reversing the direction of the rotation of motor 6.

The catch 25 is operated by an electro-magnet, (not shown) which is controlled by photo-electric control means for controlling the angular position of the magazine 3. At the moment when the photo-electric control detects that the chosen record comes into selection position, catch 25 is activated and frees the cylindrical coupler 26. The latter, under the action of the spring 27, travels to the right and activates the reversing device 28, which reverses the direction of rotation of the motor 6. After a free fixed length stroke to the right, the cylindrical coupler 26 strikes a ring-shaped molding of the bolt 22 and, by inertia, drives the latter to the right in order to engage it in a notch 23' of the magazine 3 and to lock the magazine in a selection position for the desired record. Of course, the magazine 3 presents as many notches 23' as slots for records 5.

The displacement of the bolt 22 to the right has the effect of disengaging it from the notch 24' and freeing the turntable 13 which thus begins to turn under the action of the motor 6.

The upper side of turntable 13 carries a crank handle 13' which comprises a crank for connecting rod 15 pivoted on a stud 16 carried by a sliding part 17. Thus, when the turntable 13 executes a half turn, the sliding part 17 executes a movement to the right in reference to FIG. 3. This movement allows it to carry out the following series of operations:

1. During the first one-third of its stroke, the sliding part 17 displaces, by its tip 18', a two arm lever 18 which by a counter-clockwise rotation pushes against the record 5 which is facing the outside of its slot in order to bring it to its playing position 5'.

2. During the second one-third of its stroke, the sliding part 17 operates, by means of a boss 17', a pivoted member 31 which has an inclined surface cooperating with an arm of a lever 32. As shown in FIG. 4, this lever 32 displaces a counter piece 21 into engagement with the opening in record 5 in order to lock the record in position 5' with its driving boss 19. The record can then be driven in rotation by a motor 33 whose control device is well known by itself and is not shown.

3. During the last one-third of its stroke, the sliding part 17 controls a rotation of the pick-up arm 20 in the direction of the arrow 20' in order to bring it opposite the surface of the record to be played.

4. During the second third of its stroke, the sliding part 17 likewise controls rocking of the pick-up arm 20 in order to prepare it to advance to one or to the other side of the record 5' in playing position. This function will be described later in reference to FIG. 6.

5. In its farthest position to the right, sliding part 17 displaces the catch 25 which is pivoted on said sliding part at a sufficient distance so that it can return to engage itself on the cylindrical coupler 26 and to be ready to bring the latter back to the left.

FIGS. 3–6 show in more detail the mechanisms controlling the movement of the pick-up arm 20 into position for the beginning of the playing of a record. FIG. 3 shows that the pick-up arm 20 is pivoted on a stirrup 50 by a pivot 34, said stirrup carrying a pivot rod 35 turning in a support 49 sliding on two transverse rods 36 mounted on the case 4.

Figure 5:
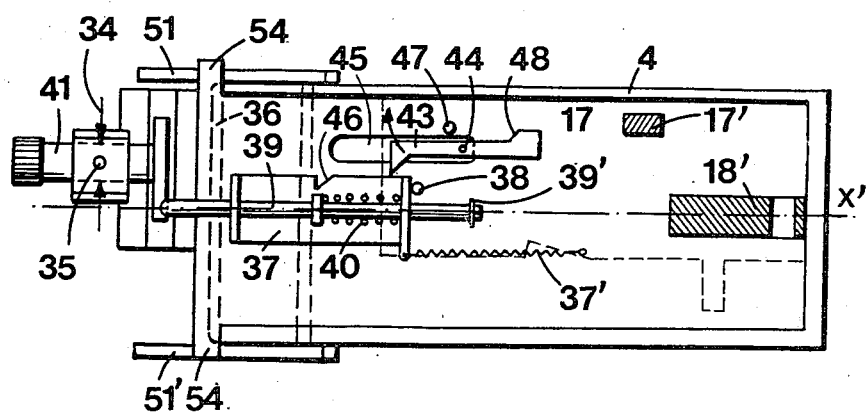

The pick-up arm 20 is subject to the action of a spring 42 which stretches to make the arm pivot in the direction of the arrow 20', but which is prevented from doing so by a bolt 39 slidably mounted on a guide block 37 which is capable of displacing itself on sliding part 17. FIG. 5 shows that the guide block 37 is subject to the traction of a spring 37' which holds it pressed against an abutment 38 of sliding part 17. When part 17 starts to displace itself to the right, it drives the guide block 37 with it, but the bolt 39, under the action of a spring 40, does not accompany the guide block 37 and holds the pick-up arm 20 in the position illustrated in FIG. 3 until the guide block 37 is sufficiently displaced to strike a flexible ring 39' on the bolt 39. This delay in the release of the pick-up arm 20 is sufficient to allow the lever 18 to bring a record to its playing position. At the moment when the arm arrives opposite the beginning of the record, a catch 43 pivoted on a pin 44 fixed on the case 4 and disposed over a slot 45 of the sliding part 17, falls in a notch 46 on the guide block 37, which causes the stopping of the latter and of the movement of the pick-up arm 20. The sliding part 17 continues to move to the right while another mechanism, which will be described later, causes the pick-up arm 20 to pivot in order to bring it in contact with the side of the record to be played. At this moment, a stud 47 on the sliding part 17 engages an inclined surface 48 of the catch 43 in order to disengage it from the notch 46 and to allow the pick-up arm 20 to follow the track of the record during playing. At the time of the preselection of a record, information is stored to indicate which of the two sides of the record is to be played. The pick-up arm 20 must then be able to be brought opposite to one side or opposite to the other side of any record which is in playing position and it comprises, like those pick-up arms which are well known, a play-back head having two opposed needles. For that purpose, the support 49, on which the pick-up arm is articulated to the shaft, can slide on the rods 36 under the action of the mechanism illustrated in FIG. 6. The support 49 has a finger 59 engaged in a radial notch of a disc 55 rotating on an axis 56. This disc has a second radial notch in which is engaged a finger 58 of a sliding rod 57, held in the position illustrated in FIG. 6 by a spring, (not shown).

Referring further to FIG. 6, the sliding rod 57 carries a catch 65 pivoted on a pin 65' and subject to the action of a spring 66'. The catch 65 is subject to the action of an electro-magnet which receives the same signal as the electro-magnet acting on the catch 25 in order to cause the stopping of the rotating magazine 3. The selection of the playing of one side or the other of a record is obtained by making the signal of a short or long duration. In the case of a short duration signal, the catch 65 is activated in order to engage itself in a notch 66 located on the lower side of the sliding part 17. Because of the short signal duration, the catch 65 moves away from the notch 66 before the sliding part 17 is displaced from a selected value to the right, and the sliding rod 57 then rests in the position indicated in FIG. 6.

On the contrary, if the duration of the signal is long, the sliding part 17 is displaced to the right while the catch 65 is engaged in the notch 66, which drives the sliding rod 57 to the right. The catch 65 has a boss 67 which comes to cooperate with a stud 68 integral with the case 4, which prevents the catch 65 from resuming its rest position. In the terminal position of the rod 57, the boss 67 hooks itself on the stud 68 in order to form a retaining catch.

As will be seen later, after the playing of the record, the turntable 13 effects a second half turn to bring the sliding part 17 back from the right to the left. At the time of this return movement, a projection 61 of the part 17 enters into contact with a finger 62 of the sliding rod 57 in order to disengage the latter from its catch and to bring the assembly back to the position illustrated in FIG. 6.

With reference to FIG. 4, the stirrup 50 is integral with a compensator 50' carrying two wire springs 53 and 53'. This compensator 50' is in contact with two arms 51 and 51' which hold it in a horizontal position, so that the pick-up arm 20 is held in a vertical plane. When the sliding part 17 displaces itself to the right in FIG. 3, two feet 54 of said part make the arms 51 and 51' rock which withdraws the compensator 50' in order to free it. In the case illustrated in FIG. 4, the displacement of the arm 51 to the top acts on the wire spring 53, which makes the stirrup and the pick-up arm pivot in order to bring the latter in contact with the left side of the record according to FIG. 4. If, still referring to FIG. 4, the support 49 was displaced to the right, it is the arm 51' which pushes the wire spring 53' to the top, which makes the compensator 50' or the pick-up arm 20 pivot in order to bring the latter into contact with the right side of the record.

It should be noted that when the sliding part 17 is completely displaced to the right (FIG. 3), the stud 16 opens a contact 30 in order to stop the motor 6. At the end of playing a record, a well known release mechanism, activated by the position of the pick-up arm, momentarily closes a contact which is parallel to contact 30, which restarts the motor 6 in order to stop the rotation of the spool shaped part 13 and brings the piece 17 from the right to the left.

At the time of the return of the sliding part 17, the inverse of the operations previously described take place, the arms 51 and 51' bring the compensator 50' back to its neutral position, which keeps the play-back head away from the record. Next, the bolt 39 pushes the pick-up arm 20 back out of the circumference of the record. The pivoted member 31 makes the lever 32 rock in order to free the record from the boss 19, and finally the lever 18 rocks in a clockwise direction in order to raise the record from its playing position 5' and return it to its slot in the magazine 3.

During the last part of the displacement of the sliding part 17 to the left, the bolt 22 pushes against turntable 13 before falling into the notch 24. At that time, the spring 27 is compressed, thus allowing the cylindrical coupler 26 to effect the last part of its return and to act on the reversing device 28 in order to reverse the rotation direction of the motor 6 and thus control the resumption of the search of a record by rotation of the magazine 3. At the same time, the bolt 22 engages itself in the notch 24' under the action of the spring 27.

I claim:

1. Automatic record changing apparatus, comprising means (20) for playing a record, a rotating magazine (3) having slots to receive the records (5), said slots formed so that the plane of each record (5) passes through the axis of rotation of said magazine (3), the assembly of the records (5) and magazine occupying a space of generally toric shape, means (6,9,23) for controlling angular displacements of the magazine (3) in order to voluntarily bring each of the records (5) into a selection position, a control mechanism (6,8,10,12,13,14,15,17 and 18) allowing the extraction of a record (5) occupying the selection position in order to bring it to a position (5') to be played by said playing means (20), then to replace it in its slot, characterized in that said apparatus comprises a base (1), a motor (6) mounted on said base for driving said rotating magazine (3) and actuating said control mechanism, a hollow pivot (2) connected to said base and extending at an angle to a horizontal plane and through the center of the toric shaped space defined by said assembly of records and magazine, said magazine rotatably mounted on said pivot so that the axis of rotation of said magazine is also inclined relative to said horizontal plane, said control mechanism mounted on the free end of said pivot, a drive shaft (10) passing through said pivot and connected to said motor (6) at one of its ends and connected to said control mechanism at its other end, said selection position located at the upper part of said toric shaped space above said pivot, said control mechanism being located substantially in the central area of the toric shaped space such that it is partly below the record in selection position and partly above the lower part of said toric shaped space below said pivot.

2. Apparatus according to claim 1 wherein, said control mechanism includes a sliding part (17), means controlling said sliding part so as to effect a back and forth movement at the time of the playing of a record, said sliding part controlling, when moving in one direction, all of the necessary functions for the playing of a record, and when moving in the opposite direction, controlling the necessary functions for replacing the record in the magazine, to be able to do: (a) the bolting of the magazine, (b) the extraction of the record from its slot (c) the locking of the record between parts assuring its drive in rotation, (d) the placing of the pick-up arm at the start of the side selected for playing, then after the playing of the record, (e) the withdrawal of the pick-up arm, (f) the unlocking of the record, (g) its replacement in the magazine and (h) the unbolting of said magazine.

3. Apparatus according to claim 2 including a case (4) mounted on said pivot (2), a turntable (13) mounted in said case and having a notch (24') therein, a crank (13') connected to said turntable, a rod (15) connecting said crank with said sliding part (17) whereby a half-turn of said turntable (13) causes said back and forth displacements of said sliding part.

4. Apparatus according to claim 3, in which, the rotating magazine (3) includes notches (23'), a locking mechanism (22), said notches cooperating with a part of said locking mechanism in order to block the magazine (3) in each position for which a selected record (5) is brought to selection position, said locking mechanism (22) comprising a sliding bolt one of whose ends cooperates with said notches (23'), its other end cooperating with said notch in said turntable (13) of the control mechanism, so that, according to the axial position of said bolt (22), there is obtained the locking of the control mechanism or locking of the rotating magazine.

5. Apparatus according to claim 4 in which, the means for playing a record comprises a pick-up arm (20,41) pivoted on an axis parallel to the plane of the record in playing position to play one side or the other of said record, a support (49) mounted on said case (4), a stirrup (50) pivoted on said support (49), said pick-up arm connected to said stirrup, said support (49) displaceable transversely to the plane of the record (5') in playing position in order to allow said axis to displace itself on both sides of the plane of the record, two arms (51,51') acting on said stirrup (50) and functioning as a fulcrum on both sides of said stirrup to stop it from rocking during the displacements of the displaceable support (49), a mechanism (54,54) acting on said arms (51,51') in order to move them away from the stirrup and allow it to pivot around its axis, said stirrup carrying two resilient elements (53,53') displaceable by said arms when they assume their moved apart position, the distance between said resilient elements being smaller than the distance which separates said arms, so that, at the time of the moving away of said arms from the stirrup, a single elastic element cooperates with its respective arm.

6. Apparatus according to claim 5 wherein, said displaceable support (49) is subject to a force bringing it back into one of its determined extreme positions, a mechanism allowing it to move to its other extreme position against the action of this force, said mechanism comprising a catch (65) for the sliding part (17), means allowing the catch (65) to move to a coupling position during a period of short duration or respectively long duration, in order to allow the connection to be accomplished, said means being common to the means causing the moving of the sliding piece (17).

* * * * *